United States Patent [19]
Auyeung et al.

[11] Patent Number: 5,677,969
[45] Date of Patent: Oct. 14, 1997

[54] METHOD, RATE CONTROLLER, AND SYSTEM FOR PREVENTING OVERFLOW AND UNDERFLOW OF A DECODER BUFFER IN A VIDEO COMPRESSION SYSTEM

[75] Inventors: Cheung Auyeung, Hoffman Estates; Stephen Norman Levine, Itasca, both of Ill.; James Joseph Kosmach, Atlanta, Ga.

[73] Assignee: Motorola, Inc., Schaumburg, Ill.

[21] Appl. No.: 392,692

[22] Filed: Feb. 23, 1995

[51] Int. Cl.$^6$ .............................. H04N 1/41; H04N 7/12; H04N 11/02
[52] U.S. Cl. .................... 382/239; 358/426; 358/430; 348/390; 348/419
[58] Field of Search ...................... 358/261.2, 426, 358/430, 433; 348/390, 405, 409, 419; 382/239, 251

[56] References Cited

U.S. PATENT DOCUMENTS

| | | | |
|---|---|---|---|
| 4,954,892 | 9/1990 | Asai et al. | 348/390 |
| 5,134,476 | 7/1992 | Aravind et al. | 348/390 |
| 5,159,447 | 10/1992 | Haskell et al. | 348/390 |
| 5,241,383 | 8/1993 | Chen et al. | 348/405 |
| 5,283,646 | 2/1994 | Bruder | 348/415 |
| 5,491,513 | 2/1996 | Wickstrom et al. | 348/390 |

*Primary Examiner*—Edward L. Coles, Sr.
*Assistant Examiner*—Kimberly A. Williams
*Attorney, Agent, or Firm*—Darleen J. Stockley

[57] ABSTRACT

The present invention is method, rate controller, and system for preventing overflow and underflow of a decoder buffer in a video compression system. First, a plurality of quantized video bits is received from an encoder (102). The plurality of quantized video bits correspond to a video frame type. Then, a virtual buffer is created, in a rate controller, to model fullness of a decoder buffer, based on the quantized video bits, to produce a virtual buffer fullness (104). A quantization stepsize estimate is finally determined, in a rate controller, based on at least a first predetermined target bit allocation, the video frame type, and the virtual buffer fullness (106). The quantization step size estimate will prevent the overflow and underflow of a decoder buffer.

35 Claims, 2 Drawing Sheets

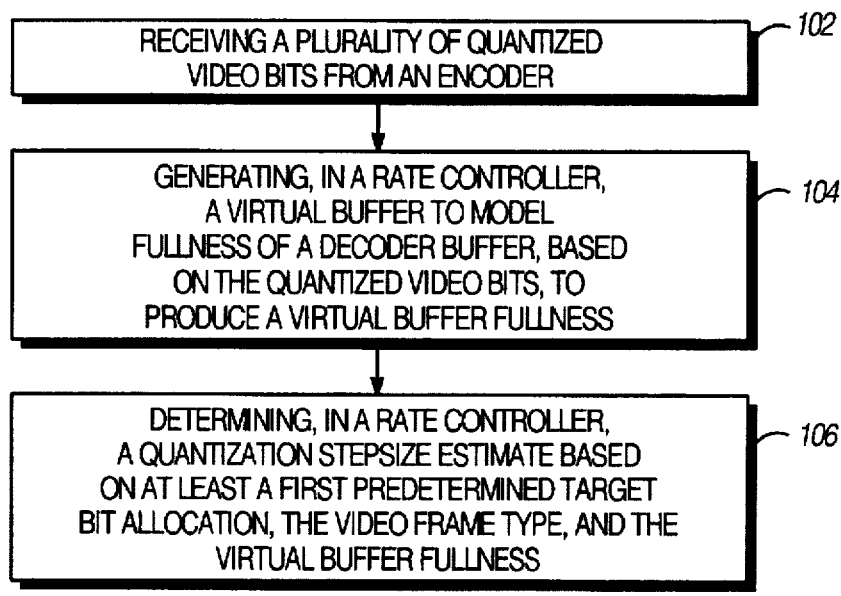
FIG.1    100
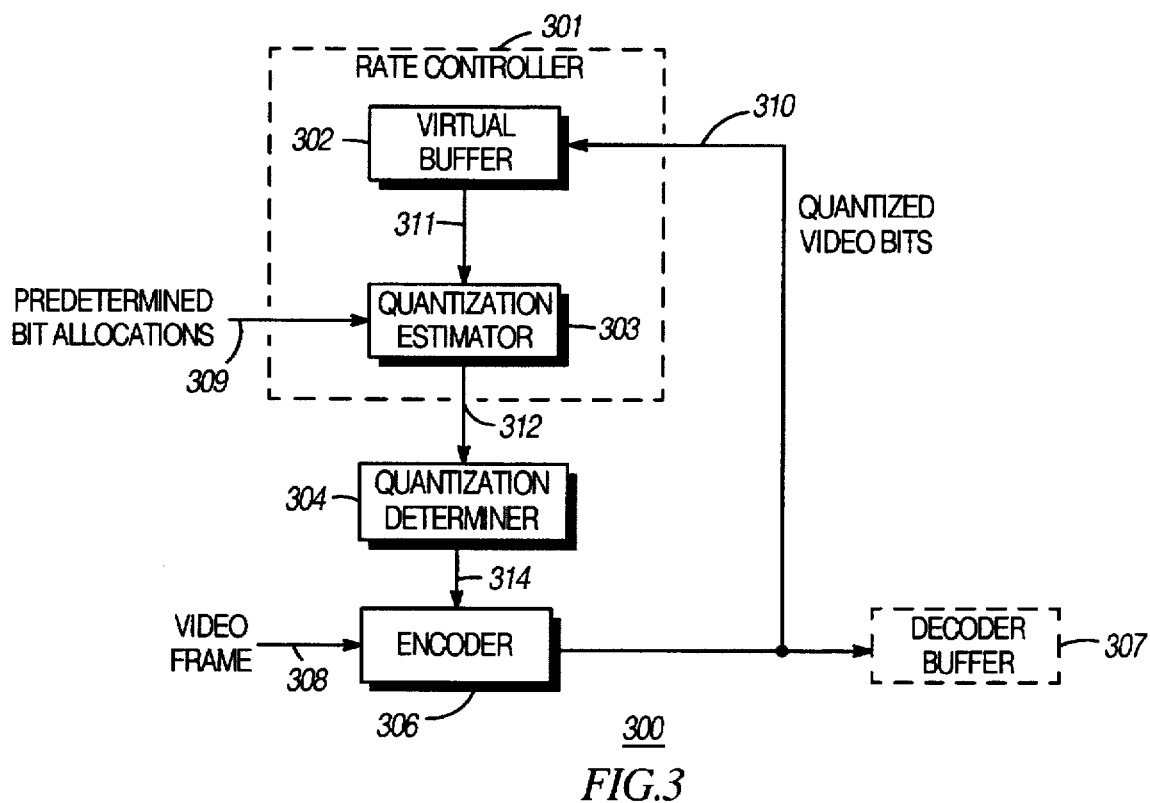
FIG.3

200

METHOD, RATE CONTROLLER, AND SYSTEM FOR PREVENTING OVERFLOW AND UNDERFLOW OF A DECODER BUFFER IN A VIDEO COMPRESSION SYSTEM

FIELD OF THE INVENTION

The invention relates generally to the field of video compression, and in particular, to the control of a decoder buffer used to store compressed video data.

BACKGROUND OF THE INVENTION

Video systems are known to include a plurality of communication devices and communication channels, which provide the communication medium for the communication devices. For example, the communication channel may be wireline connections or RF frequency carriers. To increase the efficiency of the video system, video that needs to be communicated over the communication medium is digitally compressed. The digital compression reduces the number of bits needed to represent the video while maintaining perceptual quality of the video. The reduction in bits allows more efficient use of channel bandwidth and reduces storage requirements. To achieve digital video compression, each communication device may include an encoder and a decoder. The encoder allows a communication device to compress video before transmission over a communication channel. The decoder enables the communication device to receive and process compressed video from a communication channel. Communication devices that may use digital video compression include high definition television transmitters and receivers, cable television transmitters and receivers, video telephones, computers and portable radios.

Several standards for digital video compression have emerged, including International Telecommunications Union ITU-T Recommendation H.261, the International Standards Organization/International Electrotechnical Committee, ISO/IEC, 11172-2 International Standard, MPEG-1, and the forthcoming ISO/IEC 13818-2 standard, MPEG-2. These standards designate the requirements for a decoder by specifying the syntax of a bit stream that the decoder must decode. This allows some flexibility in the creation of the encoder, but the encoder must be capable of producing a bit stream that meets the specified syntax.

To maximize usage of the available channel bandwidth and the quality of the video, the encoder seeks to match the number of bits it produces to the available channel bandwidth. This is often accomplished by selecting a target number of bits to be used for the representation of a video frame or picture. The target number of bits is referred to as the target bit allocation. The target bit allocation may be substantially different from picture to picture, based upon picture type and other considerations. A further consideration for the encoder in generating bits is the capacity of any buffers in the system. Generally, since the bitrates of the encoder and decoder are not constant, there are buffers placed at both ends of the channel, one following the encoder prior to the channel and one at the end of the channel preceding the decoder. The buffers absorb the fluctuation in bitrates. The encoder often must insure that the buffers at the encoder and decoder will not overflow or underflow as a result of the bit stream generated.

Generally, and in particular in the case of emerging video compression standards, more than one picture type is used for encoding the pictures. For example, MPEG uses intracoded pictures, predicted pictures, and bidirectionally predicted pictures. Intracoded pictures use only the information contained within the current picture itself for encoding. Predicted pictures use the current picture and a previously encoded picture as a reference to encode the current picture. By using the previously encoded picture as a reference, fewer bits are generally generated since only differences between the current picture and the previously encoded picture need to be encoded. Similarly, bidirectionally encoded pictures may use a past and/or previously encoded picture as a reference in addition to the current picture to encode the current picture. The different picture types inherently generate a varying number of bits. Since intracoded pictures do not use a reference picture for creating the current picture, they inherently use more bits than a bidirectionally encoded picture. Also, predicted pictures generally produce more bits than bidirectionally encoded pictures but less bits than intracoded pictures. The different picture types add a level of complexity to the problem of matching the encoder rate to the channel rate since different pictures inherently need to use more or less bits. In addition, the use of different picture types further complicates the control of underflow and overflow of any buffers resident in the system.

Therefore, a need exists for a method and apparatus to prevent overflow and underflow of a decoder buffer in a video compression systems and yet maintain visual quality.

BRIEF DESCRIPTION OF THE DRAWINGS

FIG. 1 is a flow diagram of one embodiment of the steps of a method for preventing overflow and underflow of a decoder buffer in a video compression system in accordance with the present invention.

FIG. 3 is a block diagram of a system which contains a rate controller for preventing overflow and underflow of a decoder buffer in a video compression system in accordance with the present invention.

DESCRIPTION OF A PREFERRED EMBODIMENTS

Figure 2:
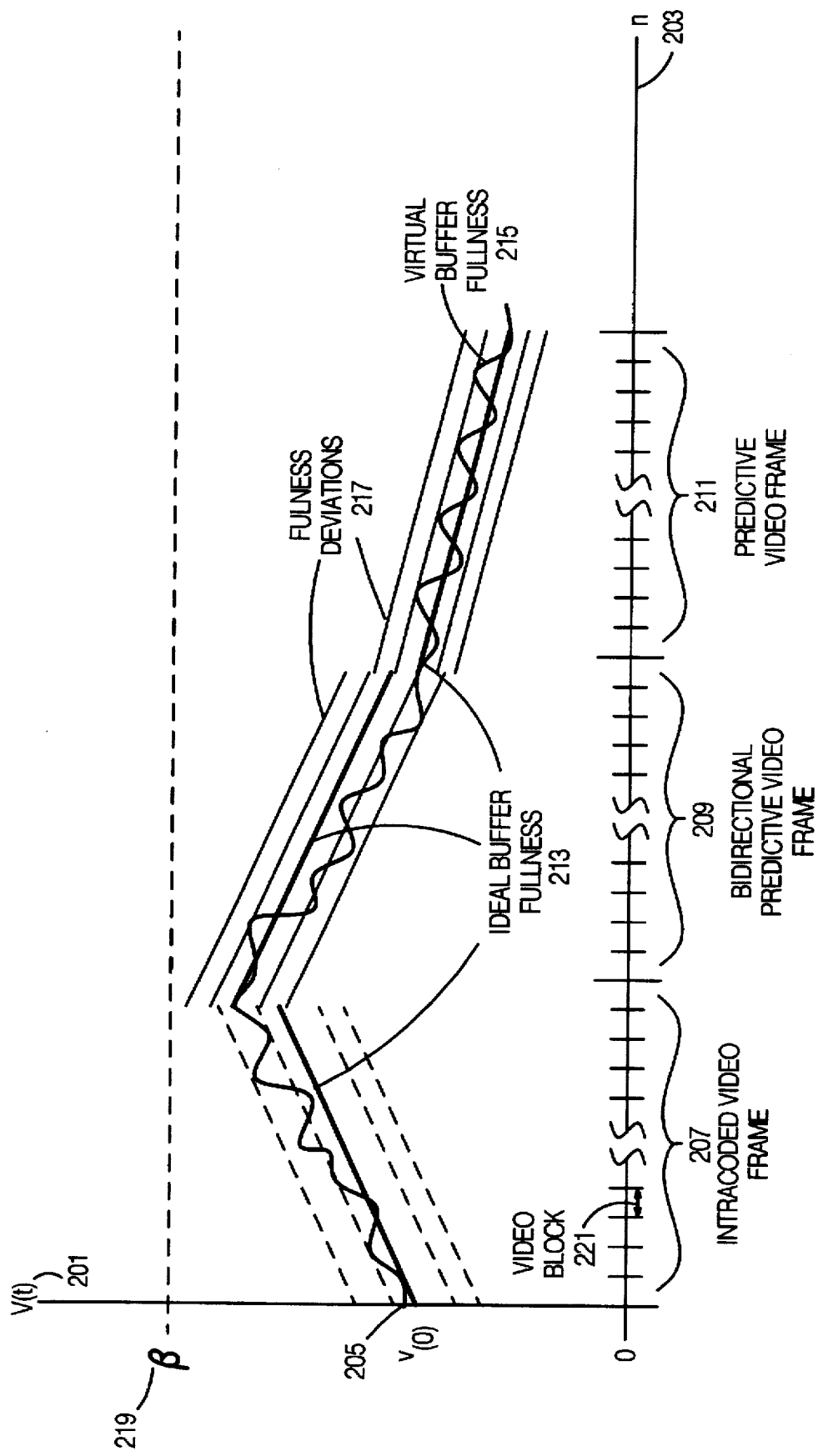
FIG. 2 is a graphical representation of a decoder buffer fullness in accordance with the present invention.

The present invention is method, rate controller, and system for preventing overflow and underflow of a decoder buffer in a video compression system. First, a plurality of quantized video bits is received from an encoder. The plurality of quantized video bits correspond to a video frame type. Then, a virtual buffer is created, in a rate controller, to model fullness of a decoder buffer, based on the quantized video bits, to produce a virtual buffer fullness. A quantization stepsize estimate is finally determined, in a rate controller, based on at least a first predetermined target bit allocation, the video frame type, and the virtual buffer fullness. The quantization step size estimate will prevent the overflow and underflow of a decoder buffer.

The compression algorithm for which this invention is applied has pictures of different types with different statistical properties. In order to maximize the overall encoding picture quality, the number of bits targeted to encode the different picture types is predetermined. This number can be substantially different from picture to picture, based upon picture type and other considerations. To achieve good encoding picture quality, the number of bits generated has to be kept close to the target bit allocation.

During encoding, a video picture is divided into successive blocks. For example, in MPEG-1 and MPEG-2, each block consists of pixels. As each block is encoded, the number of bits generated is tabulated in the virtual buffer, and the bits flow into the encoder buffer. The encoder buffer then outputs bits through a channel into the decoder buffer.

The number of bits generated from block to block generally differ substantially, whereas the number of bits output to the channel is kept constant. The number of bits generated per block can be controlled in a relative way by adjusting the amount in which each block is quantized. The exact number of bits generated with a particular quantization stepsize varies depending upon the picture content, and is not known until after the block has been compressed using the chosen quantization stepsize. However, in general the higher the quantization stepsize, the fewer the number of bits that is generated.

This invention prevents the underflow or overflow of the decoder buffer by preventing the underflow or overflow of the virtual buffer with a method that takes into account the targeted number of bits for the current picture being encoded. This is accomplished by controlling the quantization value of successive blocks so as to try to maintain the virtual buffer fullness during the encoding of the picture to follow an ideal fullness path based upon the targeted number of bits for that picture. As the number of bits generated diverges from this ideal path, the quantization stepsize is adjusted to force the virtual buffer fullness to change with the same rate as the ideal fullness path. By controlling the rate of change of the buffer fullness, overflow and underflow of the buffer are controlled and the actual number of bits generated for a video picture is kept near the target number of bits for that video picture.

The present invention can be more fully described with reference to FIGS. 1–3. FIG. 1, numeral 100, is a flow diagram of one embodiment of the steps of a method for preventing overflow and underflow of a decoder buffer in a video compression system in accordance with the present invention. First, a plurality of quantized video bits is received from an encoder (102). The plurality of quantized video bits correspond to a video frame type. Then, a virtual buffer is created, in a rate controller, to model fullness of a decoder buffer, based on the quantized video bits, to produce a virtual buffer fullness (104). A quantization stepsize estimate is finally determined, in a rate controller, based on at least a first predetermined target bit allocation, the video frame type, and the virtual buffer fullness (106). The quantization step size estimate will prevent the overflow and underflow of a decoder buffer.

The decoder buffer fullness may be modeled from the encoder buffer perspective. In general, the virtual buffer fullness is different from the encoder buffer fullness. One way to create the virtual buffer is based on an inverse relationship which is described below. Based on the virtual buffer fullness, the quantization stepsize estimate has a fullness deviation path closest to the current virtual buffer fullness.

FIG. 2, numeral 200, is a graphical representation of a decoder buffer fullness in accordance with the present invention. The virtual buffer determines the quantization stepsize estimate based on a virtual buffer fullness (215). The magnitude of the virtual buffer fullness (215) is expressed as V(t) (201), and is a function of a video block number n (203). Each video frame may be characterized as one an intracoded Video frame (207), a bidirectional predictive video frame (209), and a predictive video frame (211). Each video frame is also comprised of a number of video blocks (221).

Before any block of a video sequence is encoded, the initial virtual buffer fullness (205) is calculated from a predetermined initial decoder buffer fullness at which the decoder starts removing bits from the decoder buffer. In MPEG-1, the initial decoder buffer fullness is the fullness of the Video Buffer Verifier just before removing any bits form the Video Buffer Verifier as described in the MPEG-1 standard.

Before any block of a current picture is encoded, an ideal buffer fullness (213) is determined based on a video block number, an initial buffer fullness, the target bit allocation, and the average number of bits per frame, $\bar{R}$. The ideal buffer fullness (213) for each picture may be a straight line passing through the initial virtual buffer fullness (205) of that picture. Quantization of a subsequent video block is adjusted based on the dynamically determined ideal buffer fullness (213) and a fullness deviation (217) from the ideal buffer fullness.

Before any block of the current picture is encoded, an ideal quantization stepsize estimate for the current picture is determined to associate with the ideal buffer fullness (213) for the current picture. The ideal quantization stepsize estimate is determined based on the current picture type and the past statistics. It can be the quantization stepsize estimate of the last block of the last picture of the same picture type or the average quantization stepsize estimate of the blocks in the last picture of the same picture type.

Depending on the ideal buffer fullness (213) path, a set of fullness deviation paths (217) is also determined. A quantization stepsize estimate is also assigned to each fullness deviation path. Normally, the higher the fullness deviation path, the larger the quantization stepsize estimate. The fullness deviation path below the ideal buffer fullness has a lower quantization stepsize estimate. The highest fullness deviation path is set below the maximum buffer fullness (219), β, at all times, and the lowest fullness deviation path is greater than $\bar{R}$ at all times. The spacing between successive fullness deviation paths including the ideal buffer fullness can be fixed or a function of the quantization stepsize estimate of the fullness deviations.

In one implementation for constrained MPEG-1 system, the highest fullness deviation path corresponds to a quantization stepsize estimate of 33; the lowest fullness deviation path corresponds to a quantization stepsize estimate of −1. All the fullness deviations are parallel to the ideal fullness with a fixed distance between them. The distance between the highest fullness deviation and the lowest fullness deviation is either 3·$\bar{R}$ or the maximum spacing which will keep the highest and the lowest fullness deviation between $\bar{R}$ and β, whichever is smallest.

After a previous block is encoded, the virtual buffer fullness is updated. The quantization stepsize estimate is selected by comparing the virtual buffer fullness with the fullness deviation path. The quantization stepsize estimate of the fullness deviation path which is closest to the virtual buffer fullness is selected. If the selected quantization stepsize is outside the legal range of selected quantization, for example between and including 1 and 31 in MPEG-1, a request is made to the encoder to skip a block of quantized video bits when it is greater than the legal range. Also, a request is made to the encoder to stuff bits to the quantized video bits when it is less than the legal range.

FIG. 3, numeral 300, is a block diagram of a system which contains a rate controller for preventing overflow and underflow of a decoder buffer in a video compression system in accordance with the present invention. The system includes a rate controller (301), a quantization determiner (304), and an encoder (306). The rate controller includes a virtual buffer (302) and a quantization estimator (303).

The encoder (306) receives a video frame (308) and transforms the video frame (308) on a block by block basis. The video frame (308) is a digitized picture. The picture can be an interlaced or progressive scanned. It is classified into one of many picture types depending on how it would be encoded by the encoder (306). For example in MPEG-1, the picture type is progressive and it is one of the I, B, or P-type. For MPEG-2, the picture type depends on whether the picture is progressive or interlaced, frame- structured or field-structured, and one of the I, B or P-type. The encoder (306) quantizes each block based on a quantization stepsize (314) supplied by the quantization determiner (304) to produce quantized video bits (310). Depending on the picture type of the video picture, different transformation is performed. For example, in MPEG-1, the transformation of the I-picture is based on the current picture. The transformation of the P-picture is based on the current and a past picture. The transformation of the B-picture is based on the current, a past picture, and a future picture.

The number of quantized video bits (310) generated by the encoder (306) is regulated by the quantization estimator (303) and the quantization determiner (304) by adjusting the quantization stepsize (314) on a block by block basis. Normally, when the quantization stepsize is increased, the number of bits generated for that block is reduced, and vice versa. The rate controller (301) regulates the bitrate of the quantized video bits (310) so that there is no buffer overflow and underflow in the decoder buffer and the number of bits generated for the current picture is close to some specified amount to achieve good perceived picture quality.

Inside the rate controller (301), there is a virtual buffer (302) which keeps track of the decoder buffer fullness so that the decoder buffer (307) does not overflow and underflow. The rate controller virtual buffer fullness V(t) (311) and the decoder buffer fullness B(t) are related by:

$$V(t)+B(t+T)=\beta$$

for $t \geq 0$, where $\beta > 0$ is the decoder buffer size, and $T \geq 0$ is the time delay. The rate controller controls B(t+T) indirectly by controlling V(t). When the virtual buffer does not overflow or underflow, i.e.

$$0 \leq V(t) \leq \beta$$

the decoder buffer (307) also does not overflow or underflow, i.e.

$$0 \leq B(t+T) \leq \beta$$

The virtual buffer fullness for the nth block is updated based on buffer information. The buffer information includes the bitrate of the quantized video bits (310) for the nth block, the average bitrate per picture, and the number of blocks in a picture. The virtual buffer fullness V(n) is updated by $$V(n) = V(n-1) + r(n) - \frac{\bar{R}}{M}$$

where n is a block number, r(n) is the number of bits generated by the encoder at a time, $\bar{R}$ is the average video bitrate per picture, and M is the number of blocks in a picture.

Based on the virtual buffer fullness, the quantization estimator (303) determines a quantization stepsize estimate (312) for the block.

Based on the quantization stepsize estimate (312) the quantization determiner (304) readjusts the quantization stepsize estimate (312) to produce the quantization stepsize (314). In general, the quantization stepsize (314) increases with the quantization stepsize estimate (312), and vice versa. For example in MPEG-1, an maximum quantization stepsize estimate of 31 should result in a maximum quantization stepsize of 31.

The present invention provides a robust method for preventing overflow and underflow of a buffer in a video compression system. Other methods such as TM5 of MPEG-2 and SM3 of MPEG-1 fall to prevent overflow and underflow of a buffer in their systems. TM5 uses multiple virtual buffers, and SM3 uses one virtual buffer. The virtual buffers of SM3 and TM5 have no relationship with the decoder buffer fullness. Therefore, SM3 and TM5 have no control on the decoder buffer fullness. The present invention performs better than TM5 and SM3 due to the use of one virtual buffer which models the decoder buffer fullness by an inverse relationship. By exploiting this inverse relationship for multiple picture types, the decoder buffer is controlled by controlling the virtual buffer.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for preventing overflow and underflow of a decoder buffer in a video compression system, the method comprising the steps of:

A) receiving a plurality of quantized video bits from an encoder, wherein the plurality of quantized video bits correspond to a video frame type;

B) generating, in a rate controller, a virtual buffer to model a decoder buffer fullness, based on the plurality of quantized video bits, to produce a virtual buffer fullness; and C) determining, in the rate controller, a quantization stepsize estimate based on at least a first predetermined target bit allocation, the video frame type, and the virtual buffer fullness, wherein the quantization step size estimate prevents the overflow and underflow of the decoder buffer.

2. The method of claim 1, wherein the virtual buffer fullness is an inverse representation of the decoder buffer.

3. The method of claim 1, wherein the virtual buffer fullness is determined utilizing an equation of a form:

$$V(t)+B(t+T)=\beta,$$

where V(t) is the virtual buffer fullness, B(t) is the decoder buffer fullness, $\beta$ is a predetermined decoder buffer size, and T is a time delay based on the time between encoding and decoding.

4. The method of claim 1, wherein the quantization step size estimate is based on an ideal buffer fullness.

5. The method of claim 4, wherein the quantization step size estimate is based on a fullness deviation from the ideal buffer fullness.

6. The method of claim 5, wherein the ideal buffer fullness is based on a video block number, an initial buffer fullness, a predetermined target bit allocation, a channel bitrate, and a number of frames per second.

7. The method of claim 1, wherein the video frame type is one of:

A) an intracoded video frame type;

B) a predictive video frame type; and

C) a bi-directional predictive video frame type.

8. A rate controller for preventing overflow and underflow of a decoder buffer in a video compression system, the rate controller comprising:

a virtual buffer, operably coupled to receive a plurality of quantized video bits, for producing a virtual buffer fullness, wherein the plurality of quantized video bits correspond to a video frame type; and a quantization estimator, operably coupled to the virtual buffer and to receive at least a first predetermined target bit allocation, for producing a quantization step size estimate based on the at least first predetermined target bit allocation, the video frame type, and the virtual buffer fullness, wherein the quantization step size estimate will prevent the overflow and underflow of the decoder buffer.

9. The rate controller of claim 8, wherein the virtual buffer fullness is an inverse representation of the decoder buffer.

10. The rate controller of claim 8, wherein the virtual buffer fullness is determined utilizing an equation of a form:

$$V(t)+B(t+T)=\beta,$$

where $V(t)$ is the virtual buffer fullness, $B(t)$ is a decoder buffer fullness, $\beta$ is a predetermined decoder buffer size, and $T$ is a time delay based on the time between encoding and decoding.

11. The rate controller of claim 8, wherein the quantization step size estimate is based on an ideal buffer fullness.

12. The rate controller of claim 11, wherein the quantization step size estimate is based on a fullness deviation from the ideal buffer fullness.

13. The rate controller of claim 12, wherein the ideal buffer fullness is based on a video block number, an initial buffer fullness, a predetermined target bit allocation, a channel bitrate, and a number of frames per second.

14. The rate controller of claim 8, wherein the video frame type is one of:

A) an intracoded video frame type;

B) a predictive video frame type; and

C) a bi-directional predictive video frame type.

15. A system for preventing overflow and underflow of a decoder buffer in a video compression system, the system comprising:

an encoder, operably coupled to receive a quantization step size and a video frame, for quantizing the video frame to produce a plurality of quantized video bits, wherein the video frame corresponds to a video frame type;

a rate controller, operably coupled to the encoder, for receiving the plurality of quantized video bits to produce the quantization step size, wherein the rate controller comprises a virtual buffer for producing a virtual buffer fullness to model fullness of a decoder buffer and a quantization estimator, operably coupled to the virtual buffer and to receive predetermined bit allocations, for producing a quantization step size estimate based on at least a first predetermined target bit allocation, the video frame type, and the virtual buffer fullness; and a quantization determiner, operably coupled to the rate controller, for utilizing the quantization step size estimate to determine the quantization step size, wherein the quantization step size is utilized by the encoder to prevent the overflow and underflow of a decoder buffer.

16. A method for preventing overflow and underflow of a decoder buffer in a video compression system, the method comprising the steps of:

A) receiving a plurality of quantized video bits from an encoder, wherein the plurality of quantized video bits correspond to a video frame type;

B) generating, in a rate controller, a virtual buffer to model a decoder buffer fullness, based on the plurality of quantized video bits, to produce a virtual buffer fullness; and C) determining, in the rate controller, a quantization stepsize estimate based on at least a first predetermined target bit allocation, the video frame type, and the virtual buffer fullness, wherein the quantization step size estimate prevents the overflow and underflow of the decoder buffer, wherein the virtual buffer fullness is determined utilizing an equation of a form:

$$V(t)+B(t+T)=\beta,$$

where $V(t)$ is the virtual buffer fullness, $B(t)$ is the decoder buffer fullness, $\beta$ is a predetermined decoder buffer size, and $T$ is a time delay based on the time between encoding and decoding.

17. The method of claim 16, wherein the virtual buffer fullness is an inverse representation of the decoder buffer.

18. The method of claim 16, wherein the quantization step size estimate is based on an ideal buffer fullness.

19. The method of claim 18, wherein the quantization step size estimate is based on a fullness deviation from the ideal buffer fullness.

20. The method of claim 19, wherein the ideal buffer fullness is based on a video block number, an initial buffer fullness, a predetermined target bit allocation, a channel bitrate, and a number of frames per second.

21. The method of claim 16, wherein the video frame type is one of:

A) an intracoded video frame type;

B) a predictive video frame type; and

C) a bi-directional predictive video frame type.

22. A method for preventing overflow and underflow of a decoder buffer in a video compression system, the method comprising the steps of:

A) receiving a plurality of quantized video bits from an encoder, wherein the plurality of quantized video bits correspond to a video frame type;

B) generating, in a rate controller, a virtual buffer to model a decoder buffer fullness, based on the plurality of quantized video bits, to produce a virtual buffer fullness; and C) determining, in the rate controller, a quantization stepsize estimate based on at least a first predetermined target bit allocation, the video frame type, and the virtual buffer fullness, wherein the quantization step size estimate prevents the overflow and underflow of the decoder buffer, wherein the quantization step size estimate is based on an ideal buffer fullness, the quantization step size estimate is based on a fullness deviation from the ideal buffer fullness and the ideal buffer fullness is based on a video block number, an initial buffer fullness, a predetermined target bit allocation, a channel bitrate, and a number of frames per second.

23. The method of claim 22, wherein the virtual buffer fullness is an inverse representation of the decoder buffer.

24. The method of claim 22, wherein the virtual buffer fullness is determined utilizing an equation of a form:

$$V(t)+B(t+T)=\beta,$$

where V(t) is the virtual buffer fullness, B(t) is the decoder buffer fullness, β is a predetermined decoder buffer size, and T is a time delay based on the time between encoding and decoding.

25. The method of claim 22, wherein the video frame type is one of:

A) an intracoded video frame type;

B) a predictive video frame type; and

C) a bi-directional predictive video frame type.

26. A rate controller for preventing overflow and underflow of a decoder buffer in a video compression system, the rate controller comprising:

a virtual buffer, operably coupled to receive a plurality of quantized video bits, for producing a virtual buffer fullness, wherein the plurality of quantized video bits correspond to a video frame type; and a quantization estimator, operably coupled to the virtual buffer, for producing a quantization step size estimate based on at least a first predetermined target bit allocation, the video frame type, and the virtual buffer fullness, wherein the quantization step size estimate will prevent the overflow and underflow of the decoder buffer, wherein the virtual buffer fullness is determined utilizing an equation of a form:

$$V(t)+B(t+T)=\beta,$$

where V(t) is the virtual buffer fullness, B(t) is a decoder buffer fullness, β is a predetermined decoder buffer size, and T is a time delay based on the time between encoding and decoding.

27. The rate controller of claim 26, wherein the virtual buffer fullness is an inverse representation of the decoder buffer.

28. The rate controller of claim 26, wherein the quantization step size estimate is based on an ideal buffer fullness.

29. The rate controller of claim 28, wherein the quantization step size estimate is based on a fullness deviation from the ideal buffer fullness.

30. The rate controller of claim 29, wherein the ideal buffer fullness is based on a video block number, an initial buffer fullness, a predetermined target bit allocation, a channel bitrate, and a number of frames per second.

31. The rate controller of claim 26, wherein the video frame type is one of:

A) an intracoded video frame type;

B) a predictive video frame type; and

C) a bi-directional predictive video frame type.

32. A rate controller for preventing overflow and underflow of a decoder buffer in a video compression system, the rate controller comprising:

a virtual buffer, operably coupled to receive a plurality of quantized video bits, for producing a virtual buffer fullness, wherein the plurality of quantized video bits correspond to a video frame type; and a quantization estimator, operably coupled to the virtual buffer, for producing a quantization step size estimate based on at least a first predetermined target bit allocation, the video frame type, and the virtual buffer fullness, wherein the quantization step size estimate will prevent the overflow and underflow of the decoder buffer, wherein the quantization step size estimate is based on an ideal buffer fullness, the quantization step size estimate is based on a fullness deviation from the ideal buffer fullness, and the ideal buffer fullness is based on a video block number, an initial buffer fullness, a predetermined target bit allocation, a channel bitrate, and a number of frames per second.

33. The rate controller of claim 32, wherein the virtual fullness buffer fullness is an inverse representation of the decoder buffer.

34. The rate controller of claim 32, wherein the virtual buffer fullness is determined utilizing an equation of a form:

$$V(t)+B(t+T)=\beta,$$

where V(t) is the virtual buffer fullness, B(t) is a decoder buffer fullness, β is a predetermined decoder buffer size, and T is a time delay based on the time between encoding and decoding.

35. The rate controller of claim 32, wherein the video frame type is one of:

A) an intracoded video frame type;

B) a predictive video frame type; and

C) a bi-directional predictive video frame type.

* * * * *